Jan. 13, 1925.                         1,522,596
L. C. SHARPE
GREASE RETAINER
Filed Nov. 10, 1923
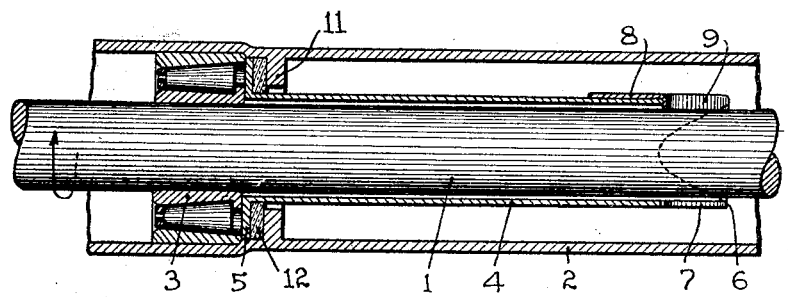
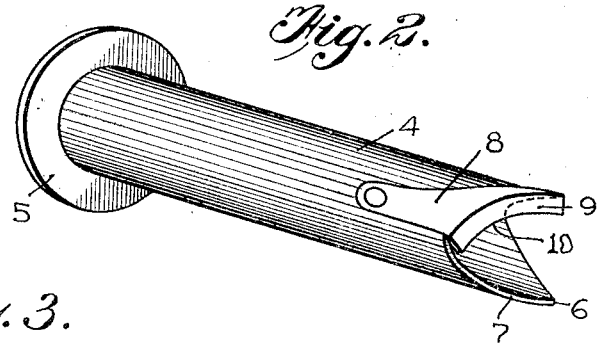
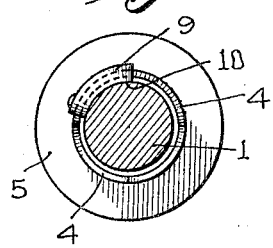
Inventor
L. C. Sharpe.

Patented Jan. 13, 1925.

1,522,596

UNITED STATES PATENT OFFICE.

LEWIS CLYDE SHARPE, OF KERRVILLE, TEXAS.

GREASE RETAINER.

Application filed November 10, 1923. Serial No. 674,071.

*To all whom it may concern:*

Be it known that I, LEWIS CLYDE SHARPE, a citizen of the United States of America, residing at Kerrville, in the county of Kerr and State of Texas, have invented certain new useful Improvements in Grease Retainers, of which the following is a specification.

This invention relates to an improvement in grease retaining devices, designed particularly for use with rear axles of automobiles, and serving when in position to prevent the lubricant of the differential from working along the axle and out onto the wheels and brake bands.

The escape of grease from the differential along the rear axle, with its consequent disfiguring of the rear wheels, brake bands, and adjacent parts of the automobile, has long been an objection in the present type of automobile, and is ordinarily sought to be overcome by washers, arranged in a housing or cage, and presumed to seal the space between the axle and housing. These washers rapidly become soaked with grease or oil and hardened so that the continued revolution of the axle soon widens the space between the washer and axle and the grease escapes more or less freely.

The present invention is directed to a retainer which closely encircles the axle and is fixed with relation to the housing, with the inner end of the retainer provided with a scraper which operates, through the revolution of the axle, to scrape the grease therefrom and thus prevent it approaching the end of the housing.

The invention is illustrated in the accompanying drawings, in which:

Fig. 1 is a view in longitudinal section, partly in elevation illustrating the application of the improvement.

Fig. 2 is a prespective view of the retainer.

Fig. 3 is an end view of the retainer, the axle being shown in section.

The improvement is shown as applied to an axle 1, such as a rear axle of an automobile, which as ordinarily mounted is revoluble within a fixed housing 2, the axle being supported at the wheel end by a bearing 3 arranged within the housing.

The improved grease retainer comprises a sleeve-like member 4 of cylindrical form, having an interior diameter slightly greater than that of the axle 1. The outer end of the member is formed or provided with a lateral flange 5, while the inner end is cutaway or reduced at diametrically opposite portions to provide points 6, and elongated edges 7 extending from the points. A scraping element 8 is formed integral with, or removably secured upon, the sleeve section 4, this element having a scraping edge 9 overlying one of the elongated edges 7 and extending inwardly toward the axle, with its inner edge 10 conforming to and arranged substantially in contact with the axle.

The retainer is applied by placing the same over the axle with the flange 5 to the outer side of the internal flange 11 of the housing, on or in which latter flange is applied in usual grease retaining washer is applied in the present construction. With the improved retainer, a fabric or leather washer 12 is provided, closely encircling the sleeve 4 and bearing between the flanges 5 and 11 when the retainer is in place. The retainer is secured by the bearing 3 and thereby held in fixed relation to the housing.

It will be noted that the scraping edge 10 of the scraper 9 is at an angle to the axial line of the axle, and that this scraper in the revolution of the axle acts to effectively remove all grease reaching the scraping point, the grease removed by the scraper falling back into the housing by the open spaces provided in cutting away the ends of the retainer. The operative end of the retainer is spaced inwardly from the end bearing 3 a sufficient distance to insure that no grease may pass between the retainer and axle and reach the outlet, that is to say, the inner end of the retainer will be ten or twelve inches from the bearing 3 in the ordinary axle construction. Grease scraped from the axle by the retainer and falling into the housing 2, cannot reach the wheel as the interior opening of the flange 11 of the housing is effectively sealed by the washer 12, and as this washer is not subjected to wear and distention of the revolving axle, as such washer is wholly free of any contact with the axle, the seal at this point will remain effective.

The comparatively small space between the axle and sleeve portion of the retainer would tend, under ordinary circumstances, to prevent any considerable portion of the grease passing along the axle, but as any such grease as may follow the axle is effectively scraped therefrom by the scraper 8, it is apparent that the outer portion of the axle is kept at all times free of grease, and hence the highly objectionable grease leakage at this point is entirely avoided.

Claims:

1. A grease retainer for rear axles arranged in a housing, comprising a member adapted to encircle the axle and having a diagonally arranged scraper at the inner end directly cooperating with the surface of the axle.

2. The combination with an axle housing and a rotatable axle therein, of a removable grease retainer held in fixed relation to the housing and encircling the axle, and a diagonally arranged scraper carried by the inner end of said retainer and adapted to engage the axle.

3. The combination with an axle housing and a rotatable axle therein, of a removable grease retainer held in fixed relation to the housing and encircling the axle, the inner end of the retainer being cut away at diametrically opposite sides to provide diverging upon spaces, and a scraper secured to the retainer and bearing on the axle, said scraper extending lengthwise one of the edges of said cutaway portion.

4. A grease retainer for axles, comprising a sleeve-like section, and a diagonally-arranged scraper arranged at the inner edge of said section, said scraper having a scraping edge extending inwardly of the sleeve-like portion.

5. A grease retainer, comprising a sleeve-like member, a retaining flange at the outer end thereof, and an axle engaging scraper at the inner end thereof and operating to insure a scraping action lengthwise the axle in operation.

6. A grease retainer, comprising a sleeve-like member, a retaining flange at the outer end thereof, and an axle engaging scraper at the inner end thereof, said scraper having a scraping edge conforming to the contour of the axle and operating to insure a scraping action lengthwise the axle in operation.

7. A grease retainer, comprising a sleeve-like member, a retaining flange at the outer end thereof, and an axle engaging scraper at the inner end thereof, said scraper having a scraping edge conforming to the contour of the axle, and arranged at other than a right angle thereto.

In testimony whereof I affix my signature.

LEWIS CLYDE SHARPE. [L. S.]